(12) United States Patent
Yi et al.

(10) Patent No.: US 9,301,242 B2
(45) Date of Patent: Mar. 29, 2016

(54) MULTIMODE ACQUISITION FOR A WIRELESS DEVICE

(71) Applicant: General Motors LLC, Detroit, MI (US)

(72) Inventors: Ki Hak Yi, Windsor (CA); Curtis L. Hay, West Bloomfield, MI (US); Andrew J. Macdonald, Grosse Pointe Park, MI (US); Yao Hui Lei, Windsor (CA); James J. Piwowarski, Holly, MI (US)

(73) Assignee: General Motors LLC, Detroit, MI (US)

( * ) Notice: Subject to any disclaimer, the term of this patent is extended or adjusted under 35 U.S.C. 154(b) by 225 days.

(21) Appl. No.: 13/671,656

(22) Filed: Nov. 8, 2012

(65) Prior Publication Data

US 2014/0128072 A1    May 8, 2014

(51) Int. Cl.
*H04W 88/02* (2009.01)
*H04W 48/18* (2009.01)
*H04W 60/00* (2009.01)

(52) U.S. Cl.
CPC .............. *H04W 48/18* (2013.01); *H04W 60/00* (2013.01)

(58) Field of Classification Search
CPC combination set(s) only.
See application file for complete search history.

(56) References Cited

U.S. PATENT DOCUMENTS

| 2011/0039533 A1* | 2/2011 | Yi et al. ......................... 455/419 |
| 2011/0039559 A1* | 2/2011 | Yi et al. ...................... 455/435.2 |
| 2012/0289166 A1* | 11/2012 | Chmielewski et al. .... 455/67.11 |

* cited by examiner

*Primary Examiner* — Diane Mizrahi
(74) *Attorney, Agent, or Firm* — Anthony Luke Simon; Reising Ethington P.C.

(57) ABSTRACT

A method of re-attempting to wirelessly connect a vehicle telematics unit with a wireless carrier system includes detecting that a primary retry method has failed; and carrying out a secondary retry method that: determines whether the vehicle telematics unit will communicate using a first radio access technology (RAT) or a second RAT; re-attempts a cellular connection with one or more base stations using a first RAT attachment procedure when it is determined that the vehicle telematics unit will communicate using the first RAT; and re-attempts a cellular connection with one or more base stations using a second RAT attachment procedure when it is determined that the vehicle telematics unit will communicate using the second RAT.

15 Claims, 2 Drawing Sheets

MULTIMODE ACQUISITION FOR A WIRELESS DEVICE

TECHNICAL FIELD

The present invention relates to wireless communication devices and more particularly to re-attempting to wirelessly connect a vehicle telematics unit with a wireless carrier system.

BACKGROUND

Wireless devices, such as cellular telephones, are commonly found in a variety of applications. Cellular telephones usually operate using only one of several cellular protocols, such as CDMA or GSM. However, more recent cellular telephone designs include cellular chipsets capable of communicating using two or more different cellular protocols so that a single device can operate on more than one network. These cellular telephones are sometimes referred to as multimode phones.

Cellular or multimode telephone applications include handheld cellular telephones as well as vehicle telematics units. But regardless of whether cellular telephones are used in handheld or vehicular environments, each application is implemented using similar software/hardware. Given that cellular/multimode telephones are used in the handheld application more frequently than the vehicular application, cellular/multimode telephone software/hardware is often optimized for handheld operation. However, cellular telephone software/hardware used in a vehicle telematics unit can be operated in such a way that it would coexist with the handheld bias of the cellular telephone software/hardware while optimizing it for use in a vehicle.

SUMMARY

According to an embodiment of the invention, there is provided a method of re-attempting to wirelessly connect a vehicle telematics unit with a wireless carrier system. The method includes detecting that a primary retry method has failed; and carrying out a secondary retry method that: determines whether the vehicle telematics unit will communicate using a first radio access technology (RAT) or a second RAT; re-attempts a cellular connection with one or more base stations using a first RAT attachment procedure when it is determined that the vehicle telematics unit will communicate using the first RAT; and re-attempts a cellular connection with one or more base stations using a second RAT attachment procedure when it is determined that the vehicle telematics unit will communicate using the second RAT.

According to another embodiment of the invention, there is provided a method of re-attempting to wirelessly connect a vehicle telematics unit with a wireless carrier system. The method includes detecting at the vehicle telematics unit a failed cellular connection via an attached base station; initiating a primary retry method that re-attempts placing a cellular connection using a wireless carrier system operating the attached base station and a previously-used radio access technology (RAT); determining that the primary retry method was unsuccessful; and initiating a secondary retry method in response to determining that the primary retry method was unsuccessful, comprising: receiving a multimode system selection (MMSS) mobile system priority list (MSPL) at the vehicle telematics unit; identifying a RAT included with the MSPL to attempt first; and determining whether to search for a base station according to a first RAT attachment procedure or a second RAT attachment procedure based on which RAT is identified.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

Figure 1:
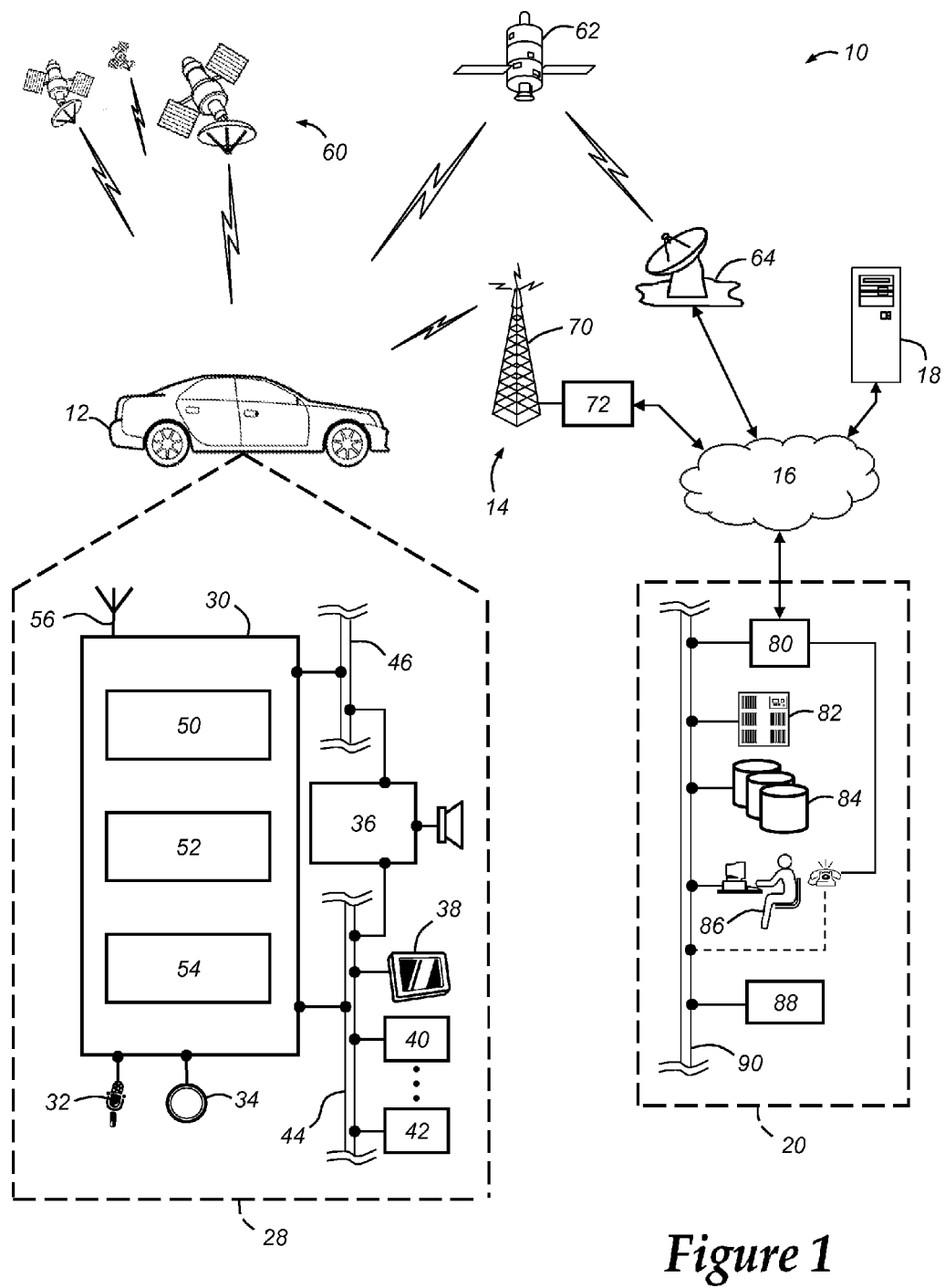
FIG. 1 is a block diagram depicting an embodiment of a communications system that is capable of using the method disclosed herein.

Occasionally, cellular telephones operating in communication with a wireless carrier system are unable to make a cellular connection using that system such that the cellular telephone cannot carry out voice and/or data communications with a third party. When a handheld cellular phone is unable to make a cellular connection, the handheld cellular phone may use a retry period of a relatively short duration (e.g., ~30 seconds). Handheld cellular phones use relatively short-duration retry periods because users of these handheld phones may not have the patience to wait much longer than 30 seconds for an attempted call to connect. However, when cellular communications are carried out in a vehicle using the cellular telephone capabilities of a vehicle telematics unit, it is possible to greatly extend the duration of the retry period. The extended retry period can be organized into a plurality of operational modes/methods. And each of the operational methods can be used with a multimode vehicle telematics unit during the extended retry period to maximize the chances of making a cellular connection the to a wireless carrier system. These retry methods can last for anywhere from 1-30 minutes or sometimes even longer.

This can be helpful when the vehicle telematics unit detects the failure of a cellular connection. In one example, a cellular connection failure can be detected when the vehicle telematics unit has been camped on a base station of a wireless carrier system, the unit attempts to place a call (voice, data, or both), and the unit determines that the call failed. This failure can occur in a variety of places in the telecommunications infrastructure. For example, the failure can occur between the vehicle telematics unit and the base station (e.g., the signal is too weak to carry out communications) or the failure can be located in a place unrelated to the telematics unit/base station connection. In the latter situation, the vehicle telematics unit may detect that it cannot communicate using the existing cellular connection and request a new cellular connection. However, the wireless carrier system may not detect that a problem exists with the cellular connection and in response to the request for a new cellular connection may provide the same cellular connection over which the vehicle telematics unit could not communicate.

The vehicle telematics unit can employ one or more of the following retry modes or methods to re-attempt a cellular connection when the vehicle telematics unit detects a cellular connection failure. By doing so, the vehicle telematics unit can obtain a new cellular connection despite the direction of the wireless carrier system. That is, the vehicle telematics unit can use a plurality of retry modes to re-attempt the cellular connection using different networks or radio access technologies even though the network providing the current cellular connection does not detect a problem. In each of these methods, at least two variables are considered at the vehicle telematics unit: a radio access technology (RAT) used to make the cellular connection and the identity of a wireless carrier system over which the cellular connection will be made. These variables can be obtained from a multimode system selection (MMSS) mobile system priority list (MSPL) and incorporated into one or more retry methods. Given that the vehicle telematics unit used in the described method/system can make cellular connections using more than one RAT (i.e., the vehicle telematics unit can include a multimode cellular chipset), the unit can increase its chances of successfully placing a cellular call by managing how it attempts different RAT/wireless carrier system combinations.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities.

In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
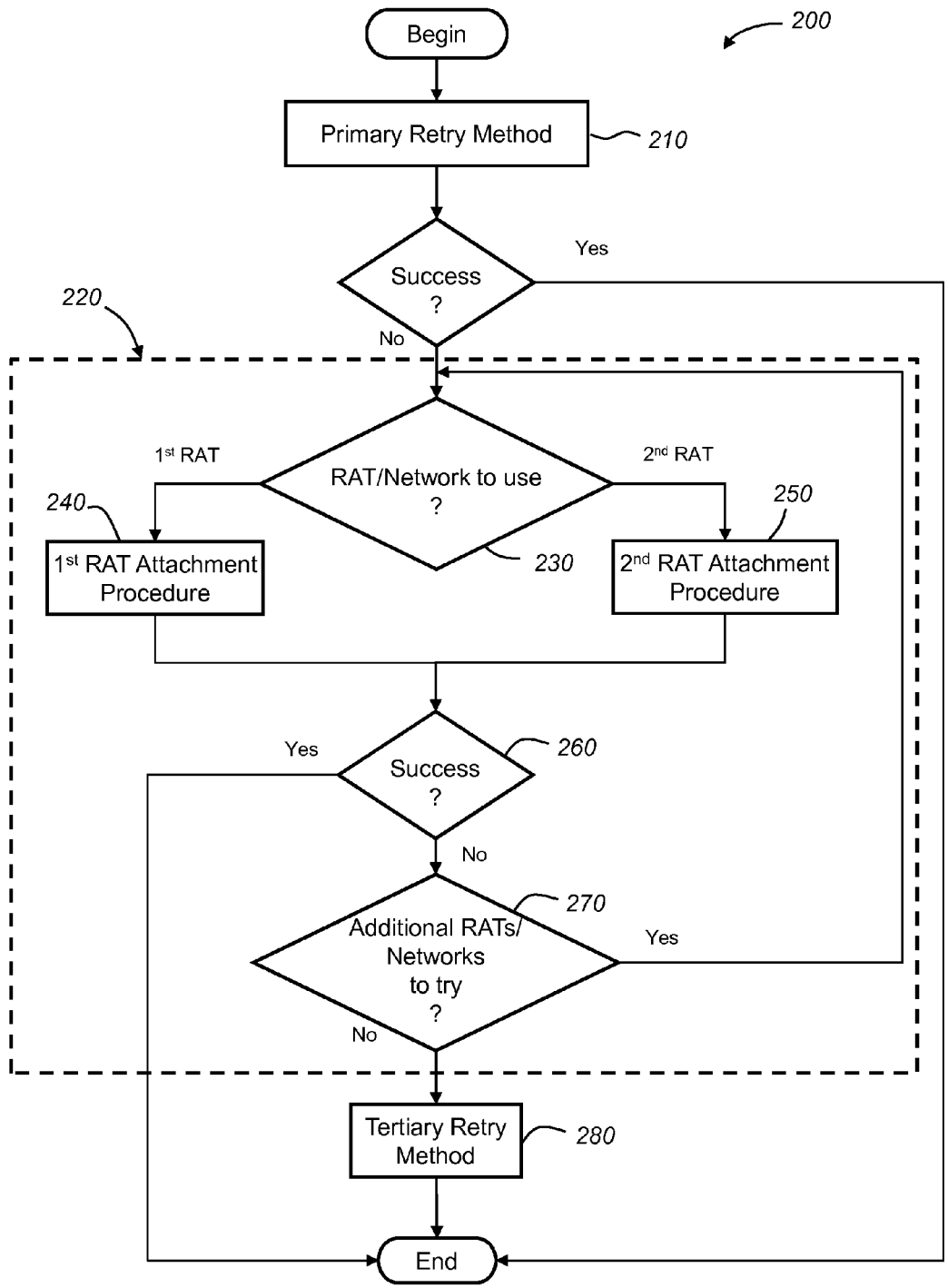
FIG. 2 is a flow chart of an embodiment of a method of re-attempting to wirelessly connect a vehicle telematics unit with a wireless carrier system.

Turning now to FIG. 2, there is shown a method 200 of re-attempting to wirelessly connect the vehicle telematics unit 30 with the wireless carrier system 14. The method 200 begins at step 210 by determining that a primary retry method has failed. This can include determining that a cellular connection has failed. In one example, this can involve the vehicle telematics unit 30 camped on a suitable wireless carrier system 14 and the unit 30 attempt to establish a call (voice, data, or both). As part of establishing the call, the vehicle telematics unit 30 can determine it is unable to establish the call or is unable to receive data via the established call. In response, the vehicle telematics unit 30 can initiate the primary retry method, which can include recognizing the radio access technology (RAT) and wireless carrier system 14 used during the unsuccessful cellular call attempt and re-attempting the call using the same RAT and wireless carrier system 14. Other implementations of the primary retry method are possible. For example, the primary retry method can also iterate through a most-recently used (MRU) or most-recently attached (MRA) list and attempt to connect to wireless carrier systems 14 that are included on the MRU or MRA lists using a corresponding RAT.

It is also possible that the vehicle telematics unit 30 can receive a multimode system selection (MMSS) mobile system priority list (MSPL) from the wireless carrier system 14 (e.g., via the cell tower 70). The MSPL can include a hierarchical list of wireless carrier system identities and their corresponding RATs that organizes the identities from highest priority to lesser priority. In addition, the vehicle telematics unit 30 can use data included in the MSPL to determine whether or not the unit 30 has camped on a suitable RAT/wireless carrier system combination. By suitable, that can mean that the wireless carrier system 14 is either a home wireless carrier system or a home-equivalent wireless carrier system such that some type of roaming agreement exists between it and the home wireless carrier system. When the vehicle telematics unit 30 powers up or exchanges information with the wireless carrier system 14, it can request and obtain a MSPL from the wireless carrier system 14.

When the vehicle telematics unit 30 re-attempts a cellular connection or call, it can determine if the RAT/wireless carrier system pair the unit 30 will attempt to use is a preferred one. This can be carried out by comparing the wireless carrier system 14 and the RAT the vehicle telematics unit 30 will attempt to use with the MSPL. If the wireless carrier system 14 is permitted, the vehicle telematics unit 30 can then (at least temporarily) freeze the MSPL. This can be carried out because the MSPL includes its own retry strategy and if the vehicle telematics unit 30 was directed by the MSPL, the unit 30 may not attempt to re-establish a cellular connection. A primary retry method can be initiated to re-attempt the cellular connection and perform a defined number of attempts to re-establish the cellular connection. The vehicle telematics unit 30 can also limit the attempts made to the wireless carrier system 14 during the primary retry method. The primary retry method can be carried out for a particular amount of time, such as 30 seconds, or for a predefined number of times. The method 200 proceeds to step 220.

After determining that the primary retry method failed at step 210, a secondary retry method 220 begins, which is generally shown within a segmented line in FIG. 2. The secondary retry method 220 includes a number of sub-steps shown in FIG. 2 within the segmented line. For example, at step 230 it is determined whether the vehicle telematics unit 30 will communicate using a first radio access technology (RAT) or a second RAT. The first and second RATs each can be classified into groups of cellular protocols. For instance, the first RAT can be described as one of the group of cellular protocols included with the 3rd Generation Partnership Project (3GPP). More specifically, these cellular protocols can include GSM, EDGE, HSPA, UMTS, and 4G implementations. In contrast, the second RAT can be described as one of the cellular protocols included with the 3rd Generation Partnership Project 2 (3GPP2). The 3GPP2 protocols can include CDMA and CDMA 2000 (e.g., 1xEV-DO) cellular protocols.

Determining whether the vehicle telematics unit 30 will use the first RAT (e.g., a 3GPP protocol) or the second RAT (e.g., a 3GPP2 protocol) can be carried out in several ways. The vehicle telematics unit 30 can be directed to find the highest priority available wireless carrier system 14 and corresponding RAT associated with the system 14 that are included in the MSPL. As part of this, the vehicle telematics unit 30 can ensure that the highest priority RAT/wireless carrier system pair included with the MSPL is available by determining that the pair was not used during the primary retry method (in that case, the vehicle telematics unit 30 can be directed to move to the next highest priority RAT/wireless carrier system pair). Once the highest priority available RAT/wireless carrier system pair is identified, the vehicle telematics unit 30 can determine whether the RAT of the pair can be classified as a first RAT or a second RAT. In one implementation, the RAT of the RAT/wireless carrier system pair can be identified as the first RAT or the second RAT by looking to the System Type variable included within an index of the MSPL. If it is determined at step 230 that the vehicle telematics unit 30 will communicate using the first RAT, then the secondary retry method 220 proceeds to step 240. However, if it is determined that the vehicle telematics unit 30 will communicate using the second RAT, then the secondary retry method 220 will proceed to step 250.

At step 240, the vehicle telematics unit 30 attempts to establish a cellular connection with one or more base stations using a first RAT attachment procedure when it is determined that the vehicle telematics unit 30 will communicate using the first RAT. The first RAT attachment procedure can be used when the when the first RAT is a cellular standard defined by 3GPP. As part of the first RAT attachment procedure, a cellular connection using the first RAT can be carried out by identifying the wireless carrier system 14 (e.g., home public land mobile network (HPLMN) or equivalent HPLM (eHPLMN)) listed as having the highest priority by the MSPL. Once identified, a cellular connection can be attempted on available base stations for the identified wireless carrier system 14 having the highest priority. A result of the first RAT attachment procedure is that the vehicle telematics unit 30 can attempt to establish the cellular connection with one or more base stations such that each attempted cellular connection is capable of providing both voice and data services over the same connection. This may be different than the outcome of the second RAT attachment procedure as will be described in more detail below. After performing the first RAT attachment procedure, the method 200 can proceed to step 260 where it can be determined whether a successful cellular connection has been established. If so, the method 200 ends. Otherwise, the method 200 proceeds to step 270.

At step 250, the vehicle telematics unit 30 attempts to establish a cellular connection with one or more base stations using a second RAT attachment procedure when it is determined that the vehicle telematics unit 30 will communicate using the second RAT. The second RAT attachment procedure can be used when the when the second RAT is a cellular standard defined by 3GPP2. As part of the second RAT attachment procedure, a cellular connection using the second RAT can be carried out by identifying the highest-priority wireless carrier system 14 included in the MSPL that is associated with the second RAT, and selecting a cellular band of that system 14. For each cellular band of the identified wireless carrier system 14, the vehicle telematics unit 30 can re-attempt a cellular connection.

Attempted cellular connections using the second RAT attachment procedure can try to establish a connection for voice service independently from a connection for data service. In addition, the second RAT attachment procedure can carry out multiple simultaneous attempts to establish separate voice or data connections within a cellular band of the identified wireless carrier system 14. This can be appreciated from the distinctions between CDMA and GSM protocols. In the latter, voice and data can be sent simultaneously using one cellular connection whereas in the former voice communications can be sent apart from data communications. Given that attempts to establish a voice connection do not interfere with attempts to establish a data connection within a wireless carrier system using the second RAT, many simultaneous connections can be attempted. However, in contrast, the first RAT attachment procedure can sequentially attempt to establish cellular connections to base stations within a HPLMN/eHPLM.

It is worth noting that the MSPL can be used to connect a wireless device to a carrier according to the direction of the MSPL. But it should also be appreciated that the present method 200 calls for using information included with the MSPL to perform an unrelated wireless retry method independent of direction from the MSPL. For instance, during method 200 the vehicle telematics unit 30 can freeze the MSPL so the unit 30 carries out the secondary retry method 220 apart from the direction of the MSPL.

After performing the second RAT attachment procedure, the method 200 can proceed to step 260 where it can be determined whether a successful cellular connection has been established. If so, the method 200 ends. Otherwise, the method 200 proceeds to step 270.

At step 270, it is determined whether or not the MSPL includes one or more additional wireless carrier systems 14 and corresponding RATs for the vehicle telematics unit 30 to use for attempting cellular connections. For example, after the first or second RAT attachment procedure has been carried out and that procedure has not yielded a successful cellular connection, the vehicle telematics unit 30 can iterate through data included with the MSPL to determine if there is a less preferred or lower priority wireless carrier system 14 than the one just selected and if so identify the RAT associated with it. After determining that another wireless carrier system 14 and RAT are included on the MSPL, the highest-priority system is selected and the method 200 returns to step 230. The method 200 can limit the number of additional wireless carrier systems 14 that can be tried by limiting the determination to home or equivalent systems or it can be limited by setting a timer that governs the amount of time allotted to perform method 200. If the vehicle telematics unit 30 determines that the wireless carrier systems/RATs included on the MSPL has been exhausted, the method proceeds to step 280.

At step 280, a tertiary retry method is initiated. After unsuccessfully carrying out the primary and secondary retry methods, the vehicle telematics unit 30 can continue to attempt cellular connections by exhausting any remaining untried wireless carrier systems identified at the vehicle 12. This can include wireless carrier systems 14 for which no reciprocal roaming agreement exists between them and a home wireless carrier system. As part of the tertiary retry method, the previously-tried wireless carrier systems can be excluded in order to prevent repeating unsuccessful attempts to establish a cellular connection. If an attempt during the tertiary retry method is successful, the cellular connection is established. Otherwise, the cellular call failed. In some cases, the tertiary retry method can be limited in duration by the execution of a global timer. The tertiary retry method can also be ended once all of the possible wireless carrier systems known to the vehicle telematics unit 30 have been tried. Alternatively, certain circumstances may call for continuously repeating cellular connection attempts until the battery of the vehicle 12 is no longer able to support these attempts. For example, if the vehicle telematics unit 30 has detected that an emergency exists or that the cellular call attempts are directed to a PSAP or other emergency service provider, then the unit 30 may allow the attempts to continue until the vehicle battery can no longer support them. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of re-attempting to wirelessly connect a vehicle telematics unit with a wireless carrier system, comprising the steps of:
   (a) detecting that a primary retry method has failed;
   (b) carrying out a secondary retry method that:
      (b1) determines whether the vehicle telematics unit will communicate using a first radio access technology (RAT) or a second RAT;
      (b2) re-attempts a cellular connection with one or more base stations using a first attachment procedure following a determination that the vehicle telematics unit will communicate using the first RAT; and
      (b3) re-attempts a cellular connection with one or more base stations using a second attachment procedure following a determination that the vehicle telematics unit will communicate using the second RAT.

2. The method of claim 1, further comprising the step of carrying out a tertiary retry method when the primary retry method and the secondary retry method have failed.

3. The method of claim 1, wherein the first RAT further comprises a 3rd Generation Partnership Project (3GPP) cellular protocol.

4. The method of claim 1, wherein the second RAT further comprises a 3rd Generation Partnership Project 2 (3GPP2) cellular protocol.

5. The method of claim 1, wherein the cellular connection attempted using the first RAT is capable of providing both voice and data simultaneously and the cellular connection attempted using the second RAT is capable of establishing voice communications independently from data communications.

6. The method of claim 1, further comprising the step of accessing at the vehicle telematics unit a multimode system selection (MMSS) mobile system priority list (MSPL) to identify the wireless carrier system and its RAT.

7. The method of claim 6, wherein the first attachment procedure further comprises identifying a home public land mobile network (HPLMN) using the MSPL.

8. The method of claim 6, wherein the second attachment procedure further comprises identifying a highest-priority wireless carrier system using the MSPL and scanning one or more cellular bands of the highest-priority wireless carrier system.

9. A method of re-attempting to wirelessly connect a vehicle telematics unit with a wireless carrier system, comprising the steps of:
   (a) detecting at the vehicle telematics unit a failed cellular connection via an attached base station;
   (b) initiating a primary retry method that re-attempts placing a cellular connection using a wireless carrier system operating the attached base station and a previously-used radio access technology (RAT);
   (c) determining that the primary retry method was unsuccessful;
   (d) initiating a secondary retry method in response to determining that the primary retry method was unsuccessful, comprising:
      (d1) receiving a multimode system selection (MMSS) mobile system priority list (MSPL) at the vehicle telematics unit;
      (d2) identifying a RAT included with the MSPL to attempt first; and
      (d3) determining whether to search for a base station according to a first RAT attachment procedure or a second RAT attachment procedure based on which RAT is identified in step (d2).

10. The method of claim 9, further comprising the step of carrying out a tertiary retry method when the primary retry method and the secondary retry method have failed.

11. The method of claim 9, further comprising the step of determining that the identified RAT is a 3rd Generation Partnership Project (3GPP) cellular protocol.

12. The method of claim 9, further comprising the step of determining that the identified RAT is a 3rd Generation Partnership Project 2 (3GPP2) cellular protocol.

13. The method of claim 9, wherein the cellular connection attempted during the first RAT attachment procedure is capable of providing both voice and data simultaneously and the cellular connection attempted during the second RAT attachment procedure is capable of establishing voice communications independently from data communications.

14. The method of claim 13, wherein the first RAT attachment procedure further comprises identifying a home public land mobile network (HPLMN) using the MSPL.

15. The method of claim 13, wherein the second RAT attachment procedure further comprises identifying a highest-priority wireless carrier system using the MSPL and scanning one or more cellular bands of the highest-priority wireless carrier system.

* * * * *